(12) United States Patent
Pedrono et al.

(10) Patent No.: US 7,740,358 B2
(45) Date of Patent: Jun. 22, 2010

(54) METHOD FOR DETERMINATION OF A PAIR OF PROGRESSIVE OPHTHALMIC LENSES

(75) Inventors: Claude Pedrono, Briis-Sous-Forges (FR); Bérangère Granger-Donetti, Charenton Cédex (FR)

(73) Assignee: Essilor International Compagnie Générale d'Optique, Cedex (FR)

( * ) Notice: Subject to any disclaimer, the term of this patent is extended or adjusted under 35 U.S.C. 154(b) by 401 days.

(21) Appl. No.: 11/574,198

(22) PCT Filed: Aug. 5, 2005

(86) PCT No.: PCT/FR2005/002036

§ 371 (c)(1),
(2), (4) Date: Jul. 24, 2007

(87) PCT Pub. No.: WO2006/027448

PCT Pub. Date: Mar. 16, 2006

(65) Prior Publication Data

US 2008/0106697 A1 May 8, 2008

(30) Foreign Application Priority Data

Aug. 27, 2004 (FR) .................................. 04 09144

(51) Int. Cl.
*A61B 3/00* (2006.01)
*G02C 5/00* (2006.01)
*G02C 7/04* (2006.01)
*G02C 7/06* (2006.01)

(52) U.S. Cl. ..................... 351/246; 351/41; 351/160 R; 351/169

(58) Field of Classification Search ......... 351/246–247, 351/169, 41, 168, 159, 160 R, 161
See application file for complete search history.

(56) References Cited

U.S. PATENT DOCUMENTS 4,606,622 A     8/1986   Fueter et al.

(Continued)

FOREIGN PATENT DOCUMENTS

CN          1346449 A      4/2002

(Continued)

OTHER PUBLICATIONS

C. Darras, "Elements et réflexions d'optique physiologique," ERA eds, p. 129 (1995).

(Continued)

*Primary Examiner*—Scott J Sugarman
*Assistant Examiner*—Dawayne A Pinkney
(74) *Attorney, Agent, or Firm*—Hensley Kim & Holzer LLC

(57) ABSTRACT

The invention relates to the determination of a pair of ophthalmic lenses, by measurement of the sagittal plane shift of the wearer for close vision with relation to the standard sagittal plane. Optimisation targets are then chosen as a function of the measured shift. The lenses are determined by optimisation with the chosen targets. Lenses are thus obtained with which the field of close vision is symmetrical with relation to the medial line as perceived by the wearer. A wearer with a displaced sagittal plane thus has a greater close vision field which facilitates binocular vision and increases acuity.

10 Claims, 15 Drawing Sheets

U.S. PATENT DOCUMENTS

Figure 1:
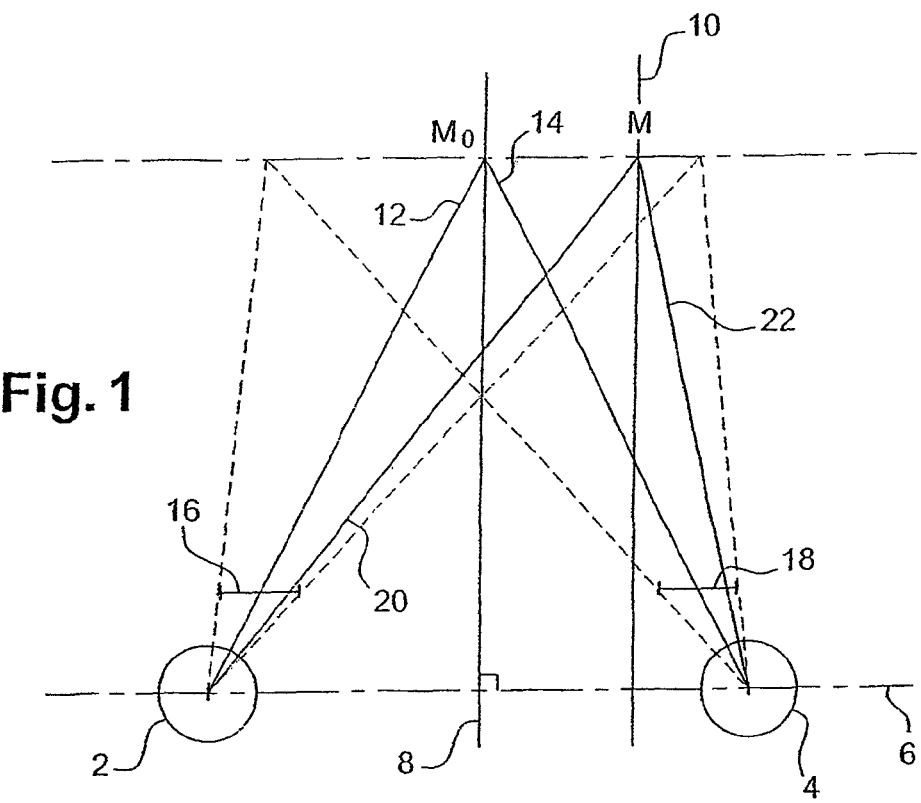

| | | | |
|---|---|---|---|
| 5,270,745 A | 12/1993 | Pedrono | |
| 5,272,495 A | 12/1993 | Pedrono | |
| 5,488,442 A | 1/1996 | Harsigny et al. | |
| 6,186,626 B1 * | 2/2001 | Francois et al. | 351/169 |
| 6,286,957 B1 | 9/2001 | Livnat | |
| 6,382,789 B1 | 5/2002 | Baudart et al. | |

FOREIGN PATENT DOCUMENTS

| | | |
|---|---|---|
| DE | 4414106 | 10/1994 |
| EP | 0039497 | 11/1981 |
| EP | 0990939 | 4/2000 |
| EP | 0994375 | 4/2000 |
| FR | 2683642 | 5/1993 |
| FR | 2699294 | 6/1994 |
| FR | 2704327 | 10/1994 |
| GB | 2130391 | 5/1984 |
| GB | 2277997 | 11/1994 |
| WO | 0146744 A2 | 6/2001 |
| WO | WO 01/46744 | 6/2001 |

OTHER PUBLICATIONS

C. Porac et al., "Sighting Dominance and Egocentric Localization," Vision Res., 26:1709-1713 (1986).

J. S. Mansfield et al., "The Binocular Computation of Visual Direction," Vision Res., 36:27-41 (1995).

Written Opinion of the International Searching Authority for International Application No. PCT/FR2005/002036 dated May 24, 2007.

* cited by examiner

US 7,740,358 B2

METHOD FOR DETERMINATION OF A PAIR OF PROGRESSIVE OPHTHALMIC LENSES

CROSS-REFERENCE TO RELATED APPLICATIONS

This application is a national phase application under 35 U.S.C. §371 of PCT International Application No. PCT/FR05/002036, filed Aug. 5, 2005, which claims priority to French Application Serial No. 0409144, filed Aug. 27, 2004.

A subject of the present invention is a method for determination of a pair of progressive ophthalmic lenses.

The ophthalmic prescription can include an astigmatism prescription. Such a prescription is produced by the ophthalmologist in the form of a pair formed by an axis value (in degrees) and an amplitude value (in diopters). Independently of this astigmatism prescription, a wearer may be prescribed a positive or negative power correction. For presbyopic wearers, the value of the power correction is different for far vision and near vision, due to the difficulties of accommodation in near vision. The prescription thus comprises a far-vision power value and an addition representing the power increment between far vision and near vision. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327.

Progressive multifocal lenses traditionally comprise an aspherical multifocal face, for example the face facing the person wearing the glasses, and a spherical or toric face, called prescription face. This spherical or toric face allows the lens to be adapted to the wearer's ametropia, prescribed by the ophthalmologist. The definition of the lens is limited in this case to finding an optimized surface for the aspherical multifocal face. Some methods for definition of the lens by optimization of the surface characteristics of the lenses are described in the above-mentioned documents.

The French patent application filed by the Applicant with the title Method for the determination of an ophthalmic lens using a far-*vision and near-vision astigmatism prescription on Aug.* 8, 2003 under number 03 09787 described a method for determination by optimization of an ophthalmic lens. This method allows the definition of a lens taking into account the optical characteristics instead of the surface characteristics of the lens. For this purpose the characteristics of an average wearer are considered, in particular as regards the position of the lens in front of the eye of the wearer in terms of curving contour, pantoscopic angle and lens-eye distance. EP-A-O 990 939 also proposes the determination of a lens by optimization taking into account the optical properties instead of the surface properties of the lens.

It has been proposed, in particular by the companies ZEISS and RODENSTOCK under the reference Zeiss Individual and Impression ILT respectively, to take into account, for the definition of progressive lenses, the real position of the lens in front of the wearer's eye. For this purpose, measurements are carried out of the position of the lens in the frame chosen by the wearer. The measurement of the position of the lens relative to the wearer's eye is difficult to carry out with precision at first. Then, the optimization is carried out for a measured position of the lens in front of the wearer's eye; it turns out that the position of the frame varies as a function of time and cannot be considered to be constant for a given wearer. As a result of these two factors, allowance for the position of the lens does not give the wearer additional comfort compared with the solutions which consider only the mean position of the lens.

The applicant sells, under the trade mark VARILUX IPSEO a range of progressive lenses, which are defined as a function of the wearer's eye-head behaviour. This definition is based on the fact that any wearer, in order to look at different points at a given height in the object space, can move either his head, or his eyes and that the viewing strategy of a wearer is based on a combination of head and eye movements. The wearer's viewing strategy effects the width of the fields on the lens. Thus, the more the wearer's lateral vision strategy involves a movement of the head, the narrower is the zone of the lens scanned by the wearer's vision. If the wearer moved only his head in order to look at different points at a given height of the object space, his vision would still pass through the same point of the lens. The product VARILUX IPSEO therefore proposes different lenses, for the same ametropia-addition pair, as a function of the wearer's lateral vision strategy.

C. Darras, *Elements et reflexions d'optique physiologique*, ERA eds, 1995, pages 129 onwards, indicates that the fixation point for a wearer in far vision, is more or less shifted relative to the sagittal plane on the side of the dominant eye. The sagittal plane, in this context, is the mid-plane of the segment the ends of which are the centres of rotation of the eyes. The projection of the fixation point onto the base line passing through the centre of rotation of the eyes is called the centre of viewing. Because of the shift, the centre of viewing is not necessarily merged with the point of intersection of the sagittal plane and of the base line. No practical consequences arise from this observation, other than to confirm that the accommodation-convergence relationship involves numerous elements, that the research is very difficult and must be conducted prudently and cautiously.

C. Porac and S. Coren, *Sighting Dominance and Egocentric Localization*, Vision Res., Vol. 26 no. 10, 1986, pp. 1709-1713, also mention that the reference point for the visual location is still to be found between the middle point of the interocular axis and the line of vision of the dominant eye. No practical consequences arise from this observation either.

J. S. Mansfield and G. E. Legge, *The Binocular Computation of Visual Direction*, Vision Res., Vol. 36 no. 1, 1995, pp, 27-41, indicate that a variation in contrast between the left eye and the right eye causes a lateral shift in the directions of viewing. This document suggests that a wearer has at least one such lateral shift in the absence of variation of contrast between the two eyes.

A need still exists for a lens which gives wearers more satisfaction.

Consequently, the invention proposes in one embodiment, a method for the determination a pair of ophthalmic lenses for a wearer, comprising the steps of:
  measurement of the shift in near vision of the wearer's sagittal plane, relative to the standard sagittal plane;
  choosing, as a function of the shift measured, target values for an optimization in optical calculation under wearing conditions;
  determination of the pair of lenses by optimization using optical calculation under wearing conditions, using the chosen target values.

In one embodiment, the step of choosing comprises:
  the provision of targets in the object space for a wearer whose sagittal plane is merged with the standard sagittal plane;
  the displacement of targets in the near-vision zone, with a displacement equal to the shift measured;
  the displacement of the targets in the intermediate-vision zone, with a displacement as a function of the height in the object space and of the shift measured.

It is also possible to envisage a step of calculation of a progression meridian with:
- the provision of a progression meridian for a wearer whose sagittal plane is merged with the standard sagittal plane;
- the deformation of the progression meridian in the intermediate-vision zone and in the near-vision zone, as a function of the shift measured;
- the stage of choosing comprising the choice of target values outside the meridian.

The measurement stage can also comprise the measurement of the position of the wearer's sagittal plane during a writing task, or the measurement of the position of the wearer's sagittal plane during a reading task. In both cases, it is then possible to envisage, for one line of the task, the measurement of the position of the mean sagittal plane relative to the centre of the line.

The measurement stage can also comprise the measurement of the position of the wearer's sagittal plane for a near-vision task.

In one embodiment, the position of the wearer's sagittal plane is estimated from a measurable quantity of the physiology of the vision or of the posture, such as an ocular dominance or a suppression in near vision.

The invention also proposes a lens obtained by such a method. It also proposes a pair of progressive multifocal ophthalmic lenses, each lens having
- a far-vision zone and a near-vision zone,
- marks for angularly locating the lens and for locating a reference point of the near-vision zone
- in which the locating mark of a reference point of the near-vision zone on the lens intended for the right eye and the locating mark of a reference point of the near-vision zone on the lens intended for the left eye are in dissymmetrical positions.

For this pair of lenses, under wearing conditions, the rays coming from the wearer's eyes and passing through the reference point for near vision advantageously intersect at a point which is shifted relative to the wearer's standard sagittal plane.

Figure 2:
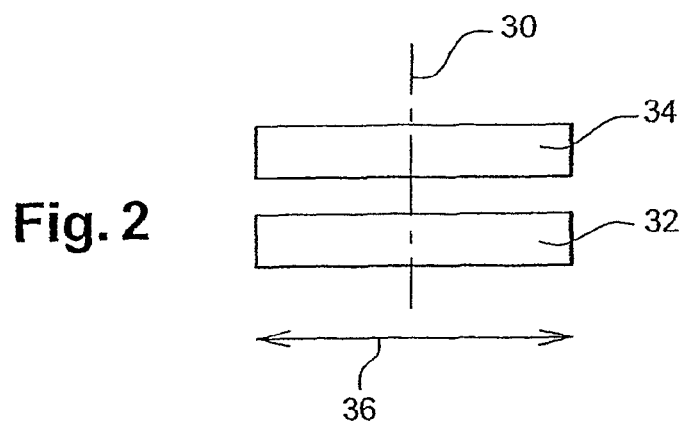
Figure 3:
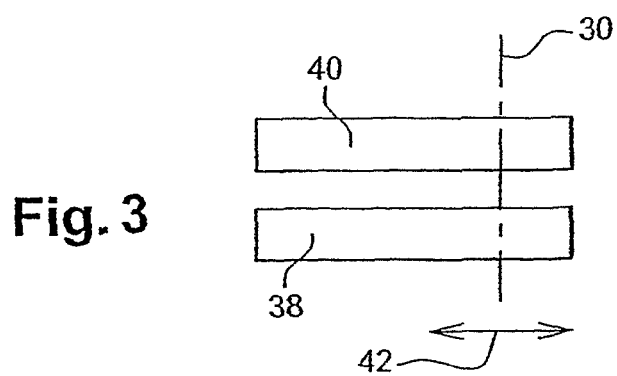
Figure 4:
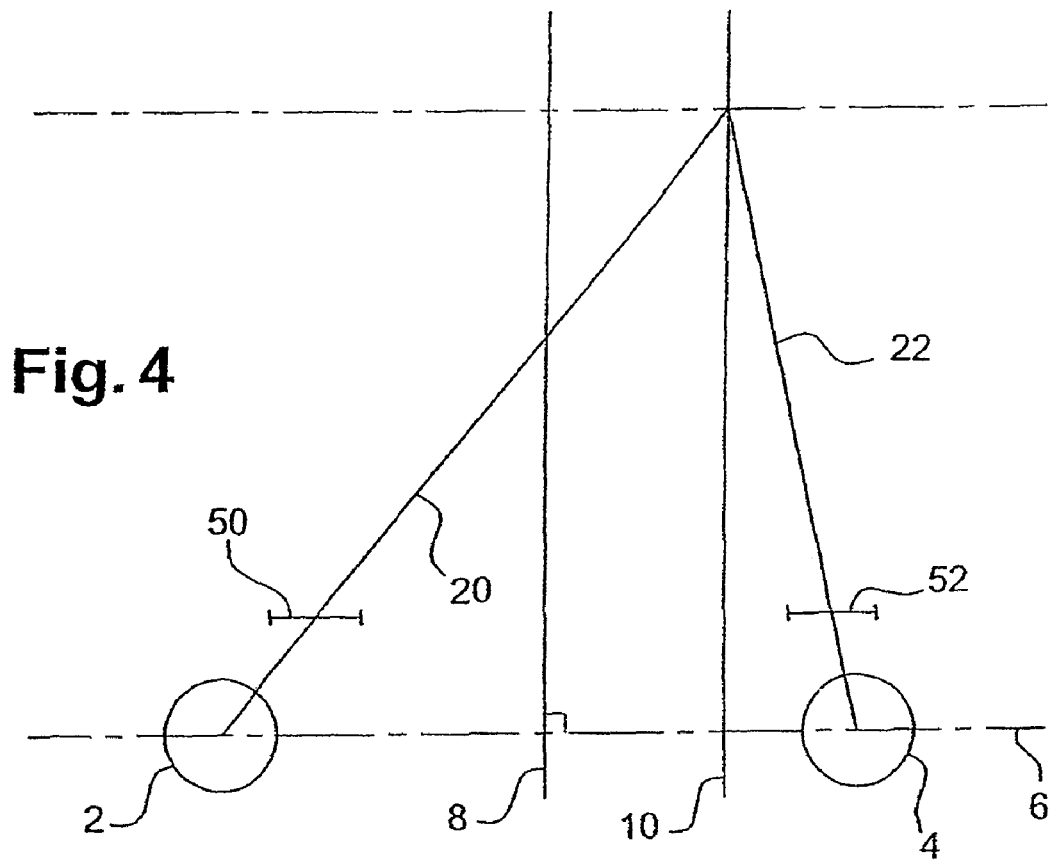
Figure 17:
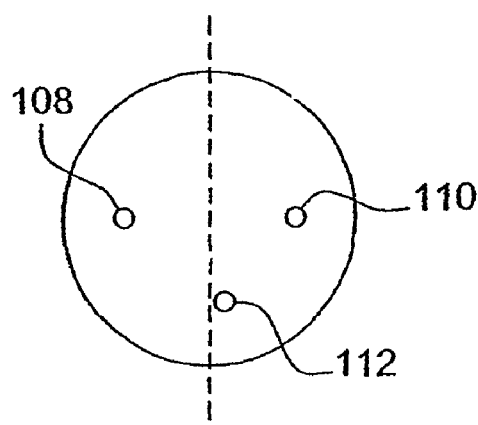
Figure 18:
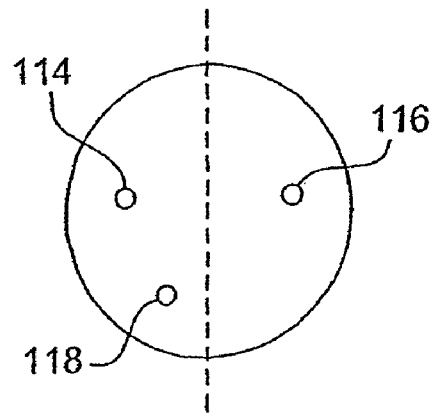
Figure 5:
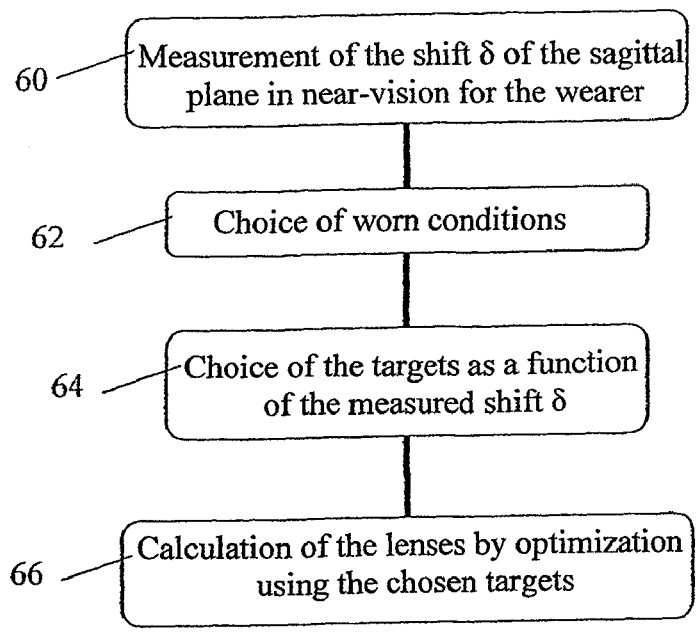
Figure 6:
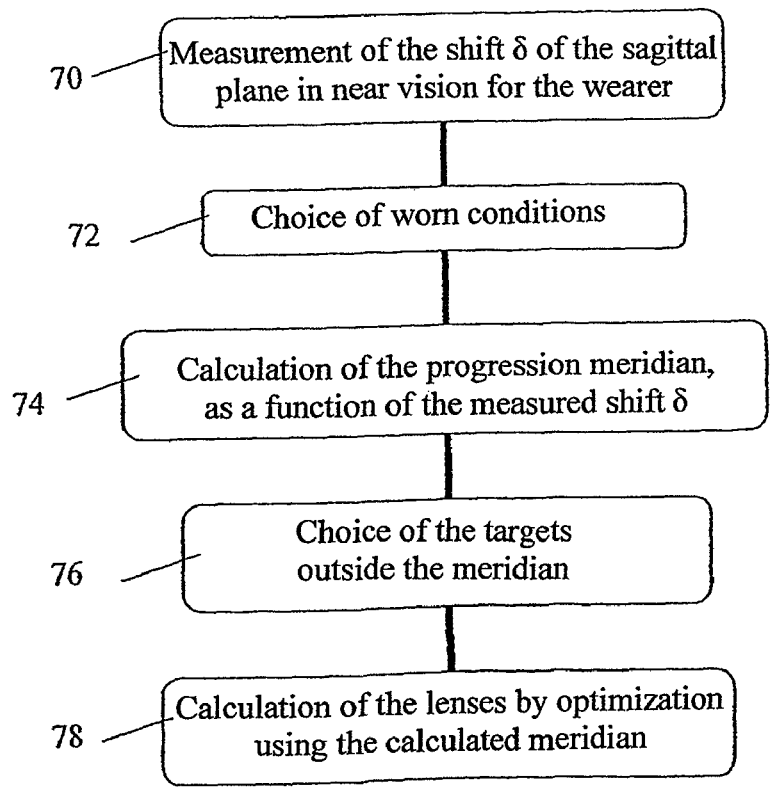
Figure 8:
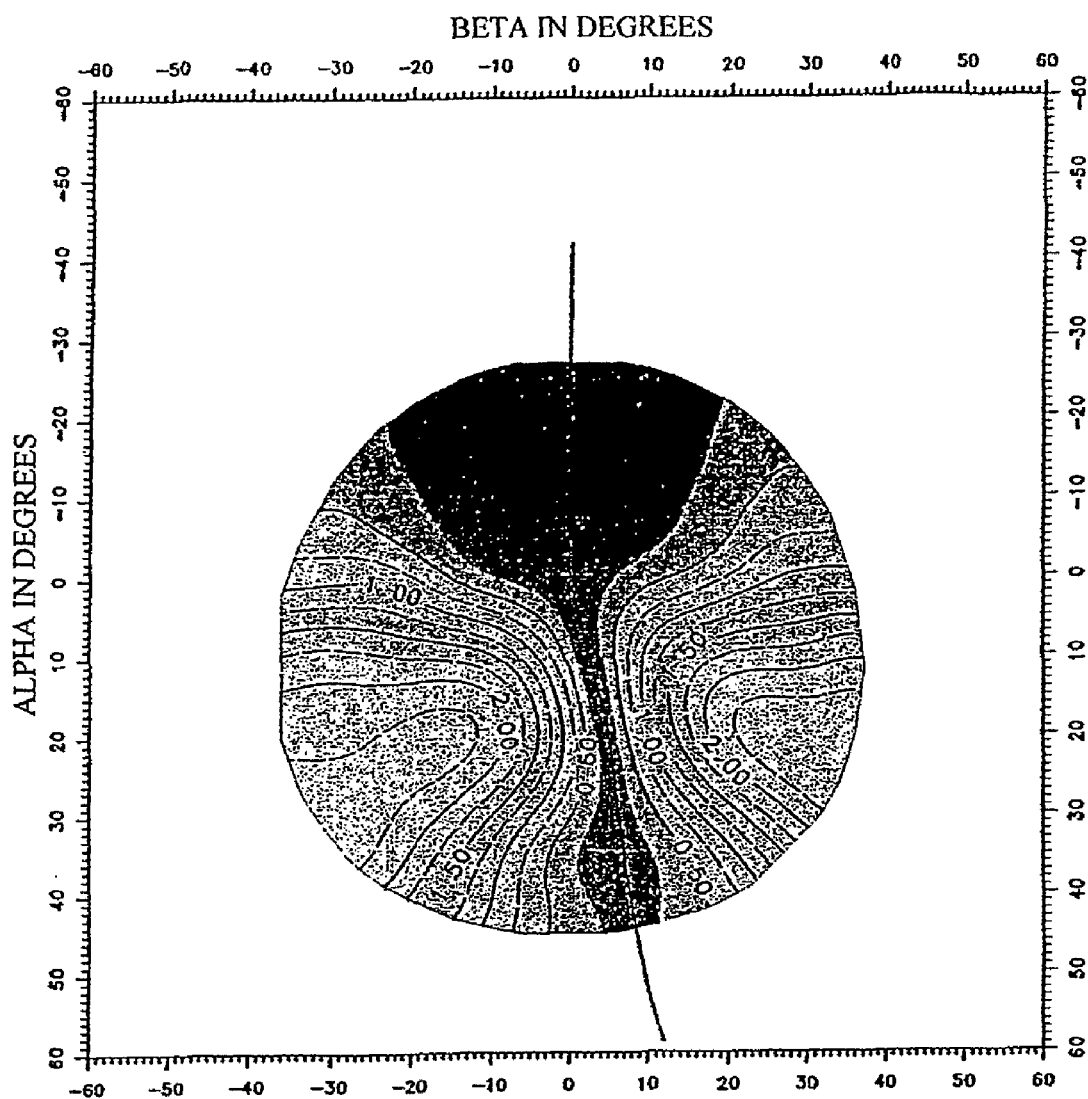
Figure 10:
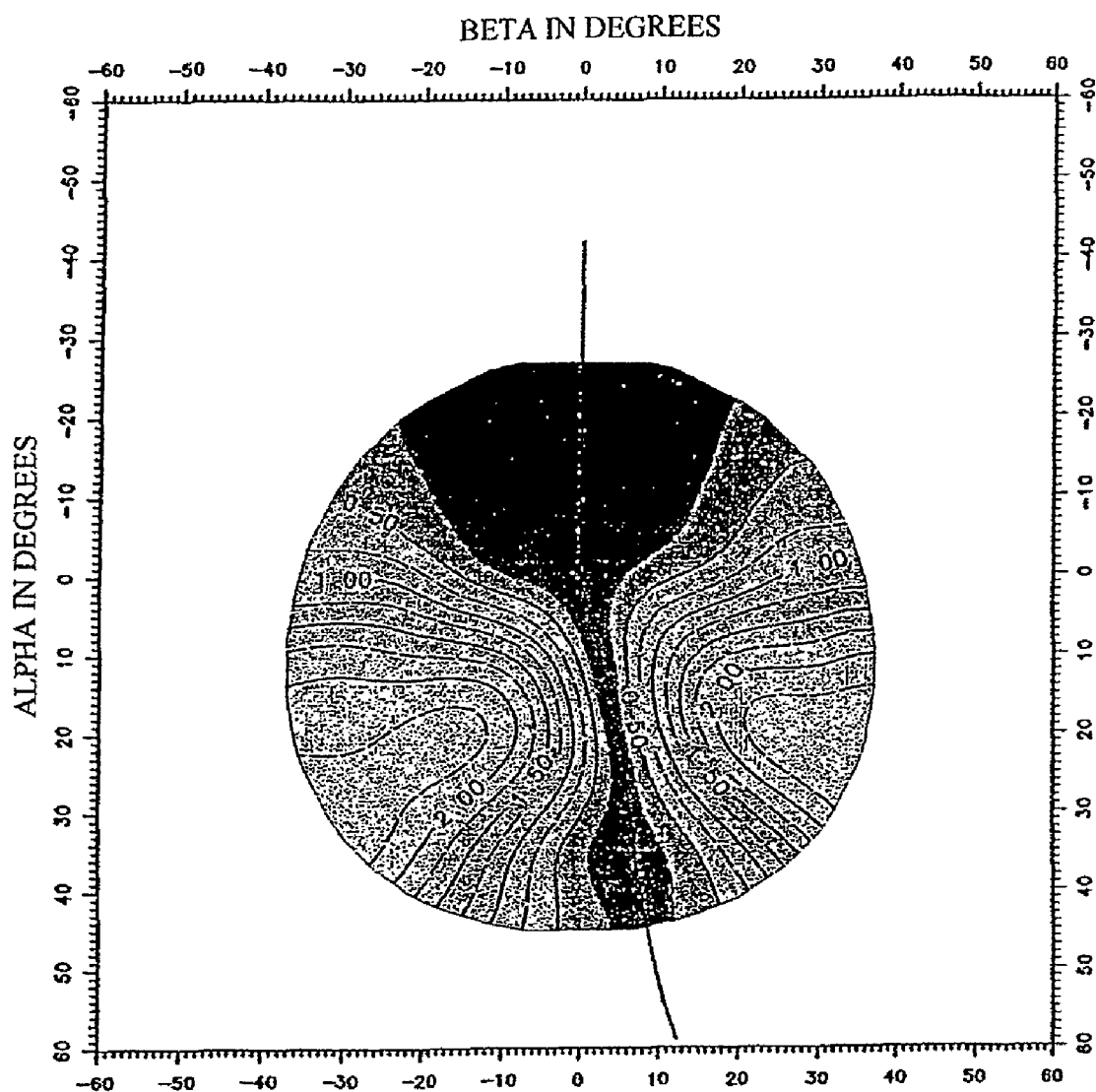
Figure 15:
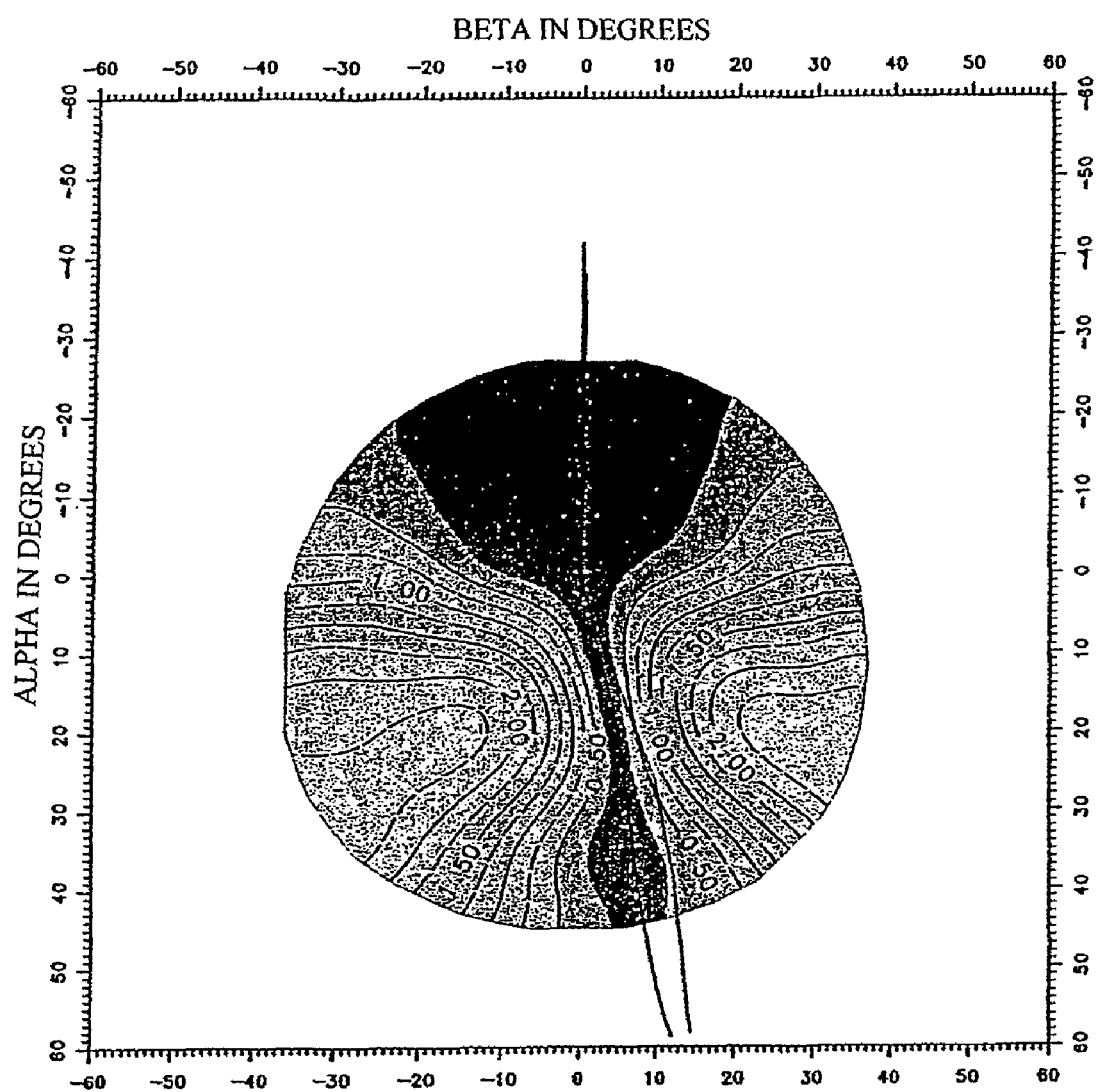
Figure 16:
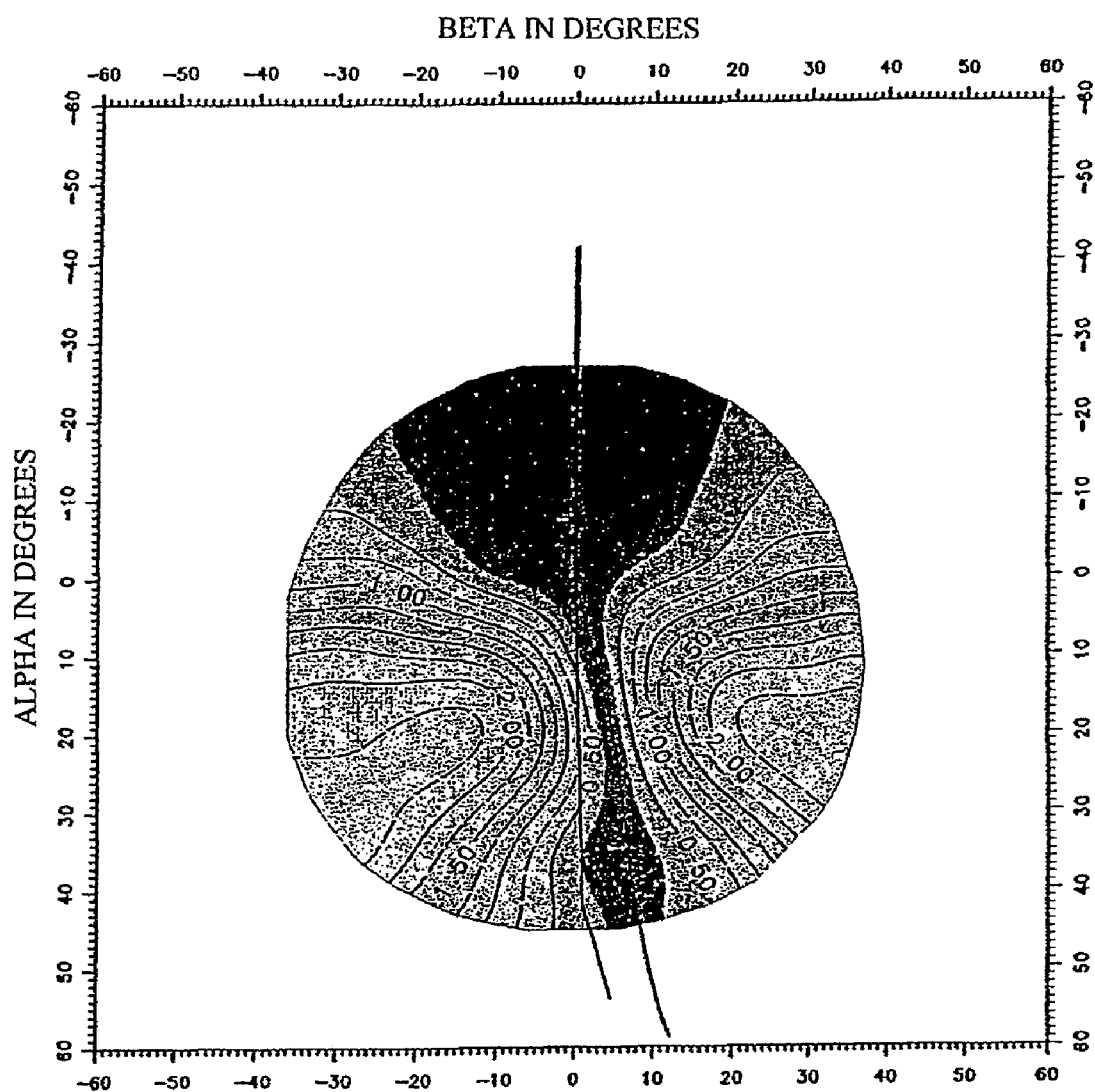
Figure 19:
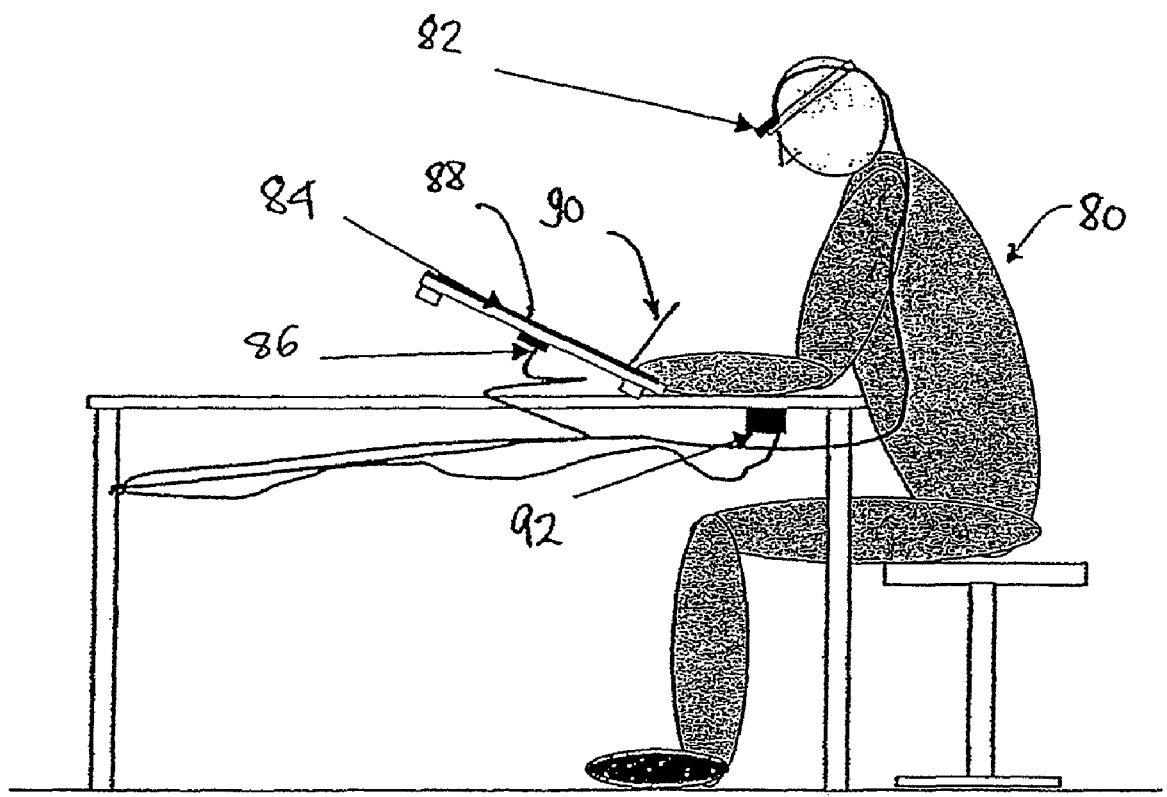
Figure 20:
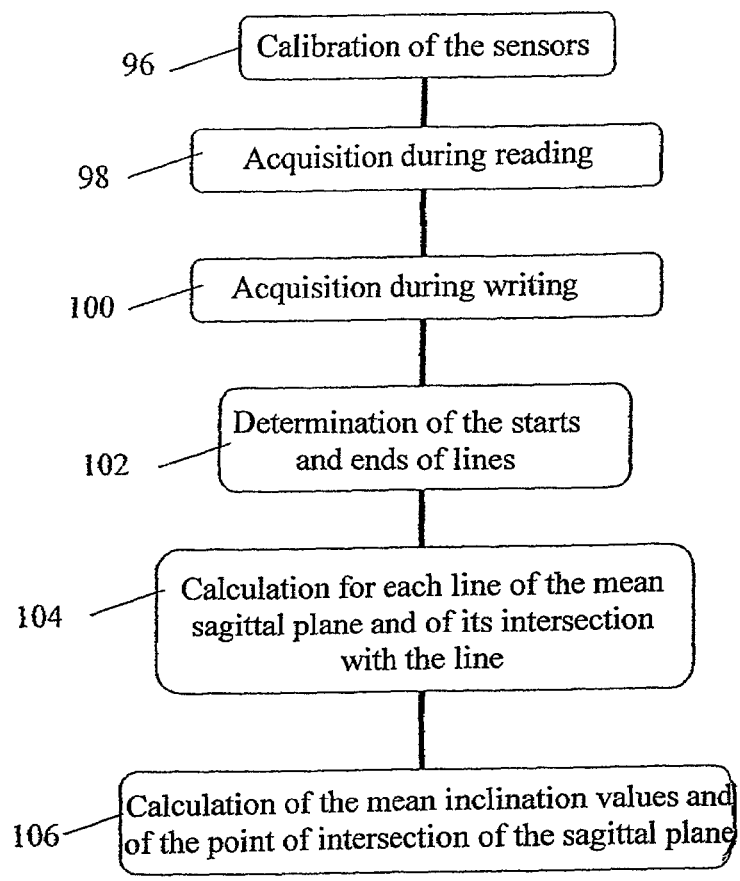
Figure 21:
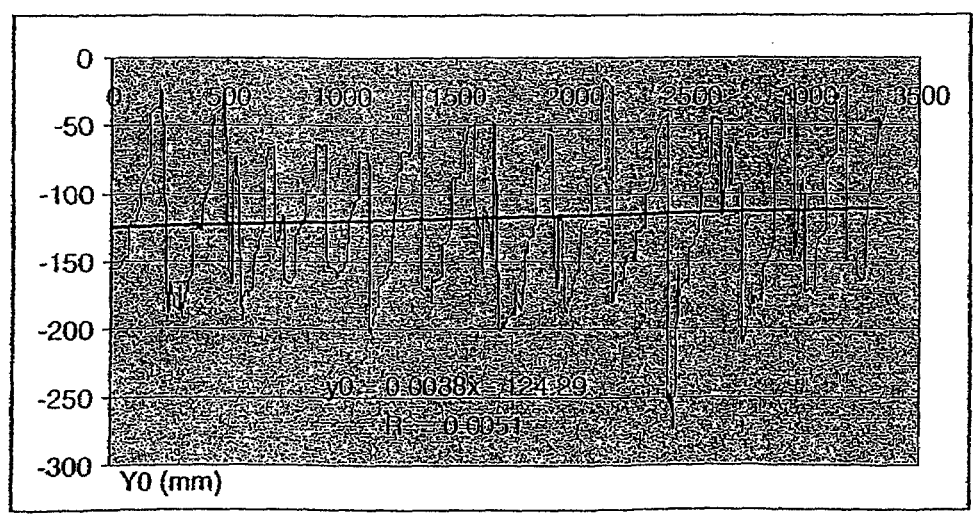

Other advantages and characteristics of the invention will become apparent on reading the following description of the embodiments of the invention, given by way of example and with reference to the drawings which show:

FIG. 1, a diagram of an eye-lens optical system, in a top view;

FIG. 2, a diagrammatical representation of the near-vision fields, for a lens of the prior art and for a standard wearer;

FIG. 3, a diagrammatical representation of the near-vision fields, for a lens of the prior art and for a wearer whose sagittal plane is shifted relative to the standard sagittal plane;

FIG. 4, a diagram similar to that of FIG. 1, showing the fields of view of a lens according to the invention;

FIGS. 5 and 6, flow charts of embodiments of the invention;

FIGS. 7 to 10, maps of wearer power and of resulting astigmatism for left and right lenses of the prior art;

FIGS. 11 to 14, maps similar to those of FIGS. 7 to 10, for left and right lenses according to an embodiment of the invention;

FIGS. 15 and 16, maps similar to those of FIGS. 8 and 10, with meridians calculated according to the embodiment of FIG. 6;

FIGS. 17 and 18, diagrammatical representations of the marks on right and left lenses according to the invention;

FIG. 19, a diagrammatical representation of an apparatus for measuring the shift of the sagittal plane for a wearer;

FIG. 20, a flow chart of a method for measuring the shift of the sagittal plane; and FIG. 21, a graph of the ordinates of the sagittal plane plotted as a function of time.

The invention proposes taking into account, for the determination of progressive ophthalmic lenses, the shift of the wearer's sagittal plane in near vision, relative to the standard sagittal plane. In the following, standard sagittal plane refers to the mid-plane of the segment the ends of which are the centres of rotation of the eyes. Sagittal plane refers to the plane orthogonal to the base line, which passes through the fixation point of viewing, in other words through the intersection of the direction of viewing for the left eye and the direction of viewing for the right eye. The base line is, as indicated above, the line passing through the centres of rotation of the eyes.

The invention makes it possible to increase the width of the fields of view perceived by the wearer of the lenses. The lenses are more comfortable to wear and provide the wearer with a more natural oculomotor strategy as well as a better lateral vision.

FIG. 1 is a diagrammatical view of a wearer's eyes, in the plane comprising the two centres of rotation of the eyes and a fixed point M which a wearer looks at in near vision. The left 2 and right 4 eyes are represented, as well as their centres of rotation. The base line 6 connects the centres of rotation of the two eyes. The standard sagittal plane is referenced 8 in FIG. 1. FIG. 1 shows a point M of the object space, in near vision; the point M is defined as the intersection of the directions of viewing for the left eye and the right eye, when the wearer looks ahead in near vision. As shown in the figure, the point M is not located in the standard sagittal plane 8, but is shifted to the right relative to this standard sagittal plane. The sagittal plane 10 is the plane perpendicular to the base line 6 passing through the point M. The shift of the sagittal plane relative to the standard sagittal plane usually occurs in the direction of the dominant eye: the example of FIG. 1 therefore corresponds to a wearer having a dominant right eye. The tests carried out by the applicant show that the shift between the sagittal plane and the standard sagittal plane can reach the value of the interpupillary half-distance.

FIG. 1 shows the point $M_0$ corresponding to a zero shift, as well as the rays 12 and 14 leaving the right eye and the left eye and passing through the point $M_0$. This point $M_0$ is situated on the standard sagittal plane. The near fields of view 16 and 18 of two lenses suited respectively to the left and right eyes are also shown. These fields of view are shown symbolically and are for example the zones of the lenses surrounding the meridian in which the resulting astigmatism is less than 0.5 diopters; the result of the combination between the total astigmatism and the prescribed astigmatism is called "resulting astigmatism". Another definition of the fields of view could be considered. In a lens of the state of the art, the near-vision zones are centred on the meridian of each lens; in other words, the rays 12 and 14 pass through each lens passing through the meridian, and the near-vision fields 16 and 18 extend symmetrically on either side of the rays 12 and 14. FIG. 1 shows with dotted limes the lateral limits of the near-vision fields as well as the rays 20 and 22 respectively leaving the left eye and the right eye and passing through the point M.

FIG. 2 shows symbolically the wearer's perception of the fields of view, in the example of FIG. 1, in the absence of shift. In FIG. 2, a vertical line 30 represents the wearer's perception of the median axis. For a zero shift of the sagittal plane relative to the standard sagittal plane—the example of point $M_0$ of FIG. 1—, the zones 32 and 34 represent the fields of view perceived by the wearer's left eye and right eye. In the absence of shift, as explained above, these fields of views are symmetrical on either side of the median axis, both for the right eye and for the left eye. The wearer's binocular vision is correct in all of the zones where the vision remains correct for the right eye and for the left eye. In the example, the zones 32 and 34 overlap, the fusion is correct over the whole of the width of the zones 32 and 34. The field width, as perceived by the wearer in near vision, is equal to the width of the zone 32 and of the zone 34 and is represented by the arrow 36 in FIG. 2. In other words, the fusion is effective over all of the field width in near vision.

FIG. 3 is similar to FIG. 2, but shows the perception of the fields by a wearer whose sagittal plane is shifted. The median axis 30 is represented again in the figure. For a wearer having a shift of the sagittal plane relative to the standard sagittal plane—the example of point M of FIG. 1—, the median axis passes through the point M. The zone 38 represents the field of view for the left eye; as shown in FIG. 1, it extends dissymmetrically relative to the median axis; more precisely, it extends more towards the left than towards the right. The zone 40 represents the field of view for the right eye; as shown in FIG. 1, the zone 40 also extends dissymmetrically relative to the median axis; however, most of the zone 40 extends towards the left. It turns out that the wearer perceives a field which is necessarily symmetrical; in other words, the fact that the field of view extends mostly on the left is not perceived by the wearer. The dissymmetrical field of FIG. 3 is perceived by the wearer as a narrow field, the limits of which are defined by the limits of the field in the right-hand part. The field perceived by the wearer whose sagittal plane is shifted is represented by the arrow 42 in FIG. 3. The field width perceived by the wearer is therefore all the smaller as the shift of the sagittal plane relative to the standard sagittal plane is greater.

The tests conducted by the applicant show that the value of shift of the sagittal plane relative to the standard sagittal plane retains a constant value for a given wearer. This shift value can be measured as explained below with reference to FIGS. 19 to 21.

The invention proposes to measure the shift of a wearer's sagittal plane, relative to the standard sagittal plane and to determine a pair of lenses for the wearer, as a function of the shift measured. The determination of the pair of lenses is carried out by optical calculation; relative to a standard calculation, the targets in the object space are shifted from the lateral shift measured.

FIG. 4 is a diagrammatical view similar to FIG. 1. FIG. 4 shows the eyes 2 and 4, the standard sagittal plane 8 and the shifted sagittal plane 10 with the point M as well as the rays 20 and 22. The figure shows the fields of view 50 and 52 for the left eye and the right eye. As the lenses are determined as a function of the shift of the sagittal plane, the fields of view are symmetrical relative to the median axis perceived by the wearer. The fields are therefore similar to those represented in FIG. 2; they are symmetrical and the wearer therefore perceives a broad field, despite the shift of the sagittal plane.

The lenses of the invention can be calculated by the methods described in the applications with the filing numbers 03 09787 and EP-A-0 990939—taking into account the shift of the sagittal plane.

FIG. 5 is a flow chart of a first embodiment of the invention. At stage 60, the shift of the sagittal plane for the wearer is measured; the method described below can be used. At stage 62, given wearing conditions are considered, which can be those proposed in the above-mentioned documents. At stage 64, the shift value of the sagittal plane measured for the wearer is then considered and the targets for the measured shift are determined. The targets can in particular be chosen in the following way. In far vision, the reference point is determined for vision at infinity; the effect of the shift is not significant in far vision and is therefore disregarded. In far vision, the targets used in the documents of the state of the art are considered. In near vision, the values of the targets of the documents of the state of the art are considered, but they are shifted in the object space, as a function of the shift of the sagittal plane. In other words, the reference point in near vision is determined by its height on the lens or by the lowering of the eyes, by the distance from the fixation point in near vision and by the shift of the sagittal plane measured at stage 60. For example, if the sagittal plane is shifted towards the right by 2 cm, there is a 2 cm shift towards the right in the object space of the targets used in the state of the art for the near-vision zone. In the intermediate-vision zone, a linear lateral shift can be applied to the targets, as a function of the height of the points in the object space. This amounts to applying to the different targets of the object space the following transformation;

$x| \to x$ $y| \to y$ $z| \to z$ for the y ordinate points greater than or equal to zero, which correspond to the target points in far vision;

$z| \to z + \delta$, for the y ordinate points less than or equal to $\gamma_0$, $\gamma_0$ being the height of the reference point for near vision, which correspond to the target points in near vision; $\delta$ being the value of the shift of the sagittal plane measured for the wearer;

$z| \to z + \gamma/\gamma_0 \, \delta$, for the $\gamma$ ordinate points comprised between 0 and $\gamma_0$, which correspond to the target points in the intermediate-vision zone.

In this example, a system of coordinates (x, y, z) is considered which is that represented in FIG. 2 of the document EP-A-0 990 939: the z axis is parallel to the base line, the y axis is vertical and orientated upwards and the x axis is orientated towards the wearer, the reference point being directly orthonormalized.

This example uses the targets of the state of the art. It is also possible to use different targets, when the choice of the targets is carried out as a function of the shift of the sagittal plane measured for the wearer. In other words, the choice of the targets is such that, in the near-vision zone, the middle of the field of view corresponds to the direction of viewing of the wearer, towards points of the sagittal plane measured. As a consequence, the fields of view are symmetrical relative to the direction of viewing for the right eye and for the left eye, when the wearer is looking in the sagittal plane.

At stage 66, the left and right lenses are determined by optimization, using optical calculation. The calculation is carried out under the wearing conditions chosen at stage 62, using the targets chosen at stage 64. The calculation is an optical calculation, i.e. there is calculation, for example by ray tracing, of the power perceived by the wearer under wearing conditions. The details of the calculation by optimization, which can be carried out according to the methods described in the above-mentioned documents of the state of the art, are not given here.

In other words, in this first embodiment, the calculation of the meridian is simplified by carrying out a shift of the existing targets and without carrying out a point-by-point calculation. The targets are simply interpolated between the reference points for far vision and for near vision; the progression meridian is therefore deduced from the meridian of the lens of the state of the art used, without it being necessary to carry out a point-by-point calculation of the meridian in the wearer's sagittal plane.

FIG. 6 is a flow chart of a second embodiment of the invention. The method of FIG. 6 differs from that of FIG. 5 in that it envisages a specific calculation of the meridian; the method uses a lens of the state of the art. At stage 70, as at stage 60 of FIG. 5, the shift of the wearer's sagittal plane is measured. At stage 72, the wearing conditions are chosen, as at stage 62 of FIG. 5. At stage 74, the meridian is determined, as proposed in the documents of the state of the art, taking into account the shift of the sagittal plane measured for the wearer, as well as the particular ergorama of the subject. In other words, a point-by-point calculation of the meridian is carried out. A shifted meridian is thus obtained, i.e. a set of directions of viewing and associated optical powers.

At stage 76, targets are chosen outside the meridian. Then, at stage 78, the lenses are calculated by optimization, using the chosen wearing conditions as well as the meridian calculated at stage 74.

The method of FIG. 5 has the advantage, relative to that of FIG. 6, of simplifying the calculations, by avoiding recalculation of the progression meridian.

The method of FIG. 5 and that of FIG. 6 lead to lenses which are suited to the shift of the sagittal plane measured on the wearer. The tests conducted by the applicant show that the wearers of lenses according to the invention perceive a broader field of view in near vision. This breadth of the field of view results in a better binocular fusion and increased comfort.

The solution of the invention does not require complex or delicate measurements.

FIGS. 7 to 16 show examples of lenses of the state of the art and lenses obtained according to the method of the invention. In each of the graphical representations, the wearer powers or the resulting astigmatism—the optical parameters—are shown, measured for different directions ($\alpha$, $\beta$) of the wearer's viewing. As explained in the above-mentioned applications, the angles $\alpha$ and $\beta$ are respectively the angle between the direction of viewing and a horizontal plane passing through the centre of rotation of the eye and the angle between the direction of viewing and a vertical plane passing through the centre of rotation of the eye. The figures show the isopower or isoastigmatism lines. The examples are applied to a wearer having the following prescription:

for the left eye, prescribed far-vision power 1.75 diopters, addition 2.25 diopters, astigmatism nil;

for the right eye, prescribed far-vision power 1.5 diopters, addition 2.25 diopters, astigmatism nil;

An ergorama of the type described in the previous applications of the state of the art is considered. The distance in near vision between the object space and the lenses of the wearer is 350 mm. The following average standard wearing conditions are considered:

distance between the centre of rotation of the eye and the lens: 27 mm;

pantoscopic angle: 12°, curving contour: 0°.

In the examples, in order to allow for a more straightforward comparison of the left and right lenses, the values of the angle $\beta$ were inverted for the left eye. As a result, the lens for the left eye, instead of having a meridian inclined towards the nose side (towards the left in the figure) in the lower part of the lens, has a meridian inclined towards the right in the figure in the lower part of the lens.

Figure 7:
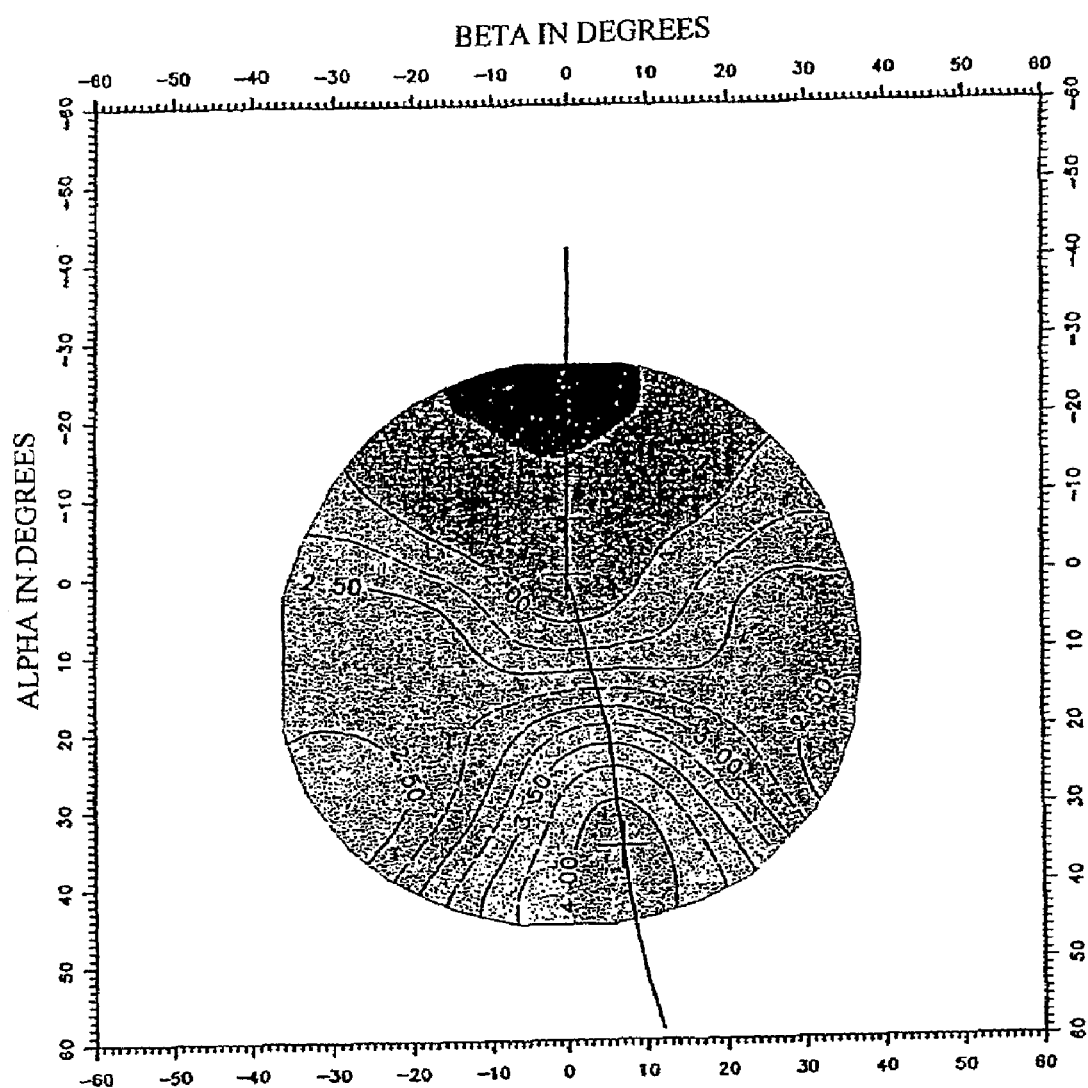
Figure 9:
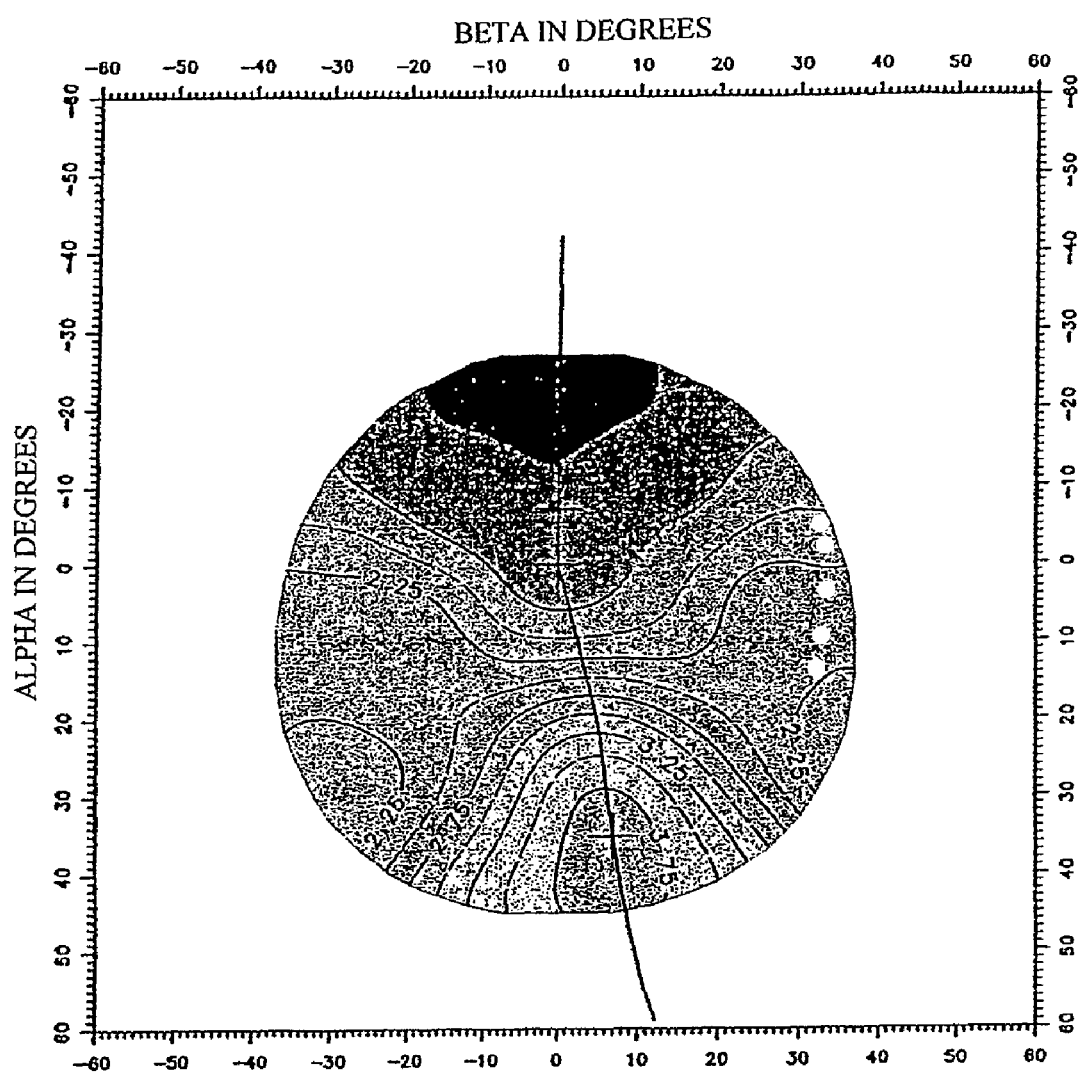

FIGS. 7 to 10 show the example of lenses of the state of the art. FIGS. 7 and 9 show the wearer power values for the left lens and the right lens; FIGS. 8 and 10 show the resulting astigmatism values for the left lens and the right lens. It is observed that the progression meridian is more or less identical in the representations of FIGS. 7 and 8 on the one hand and 9 and 10 on the other hand; this means that in the left and right lenses, the meridians are more or less symmetrical.

Figure 11:
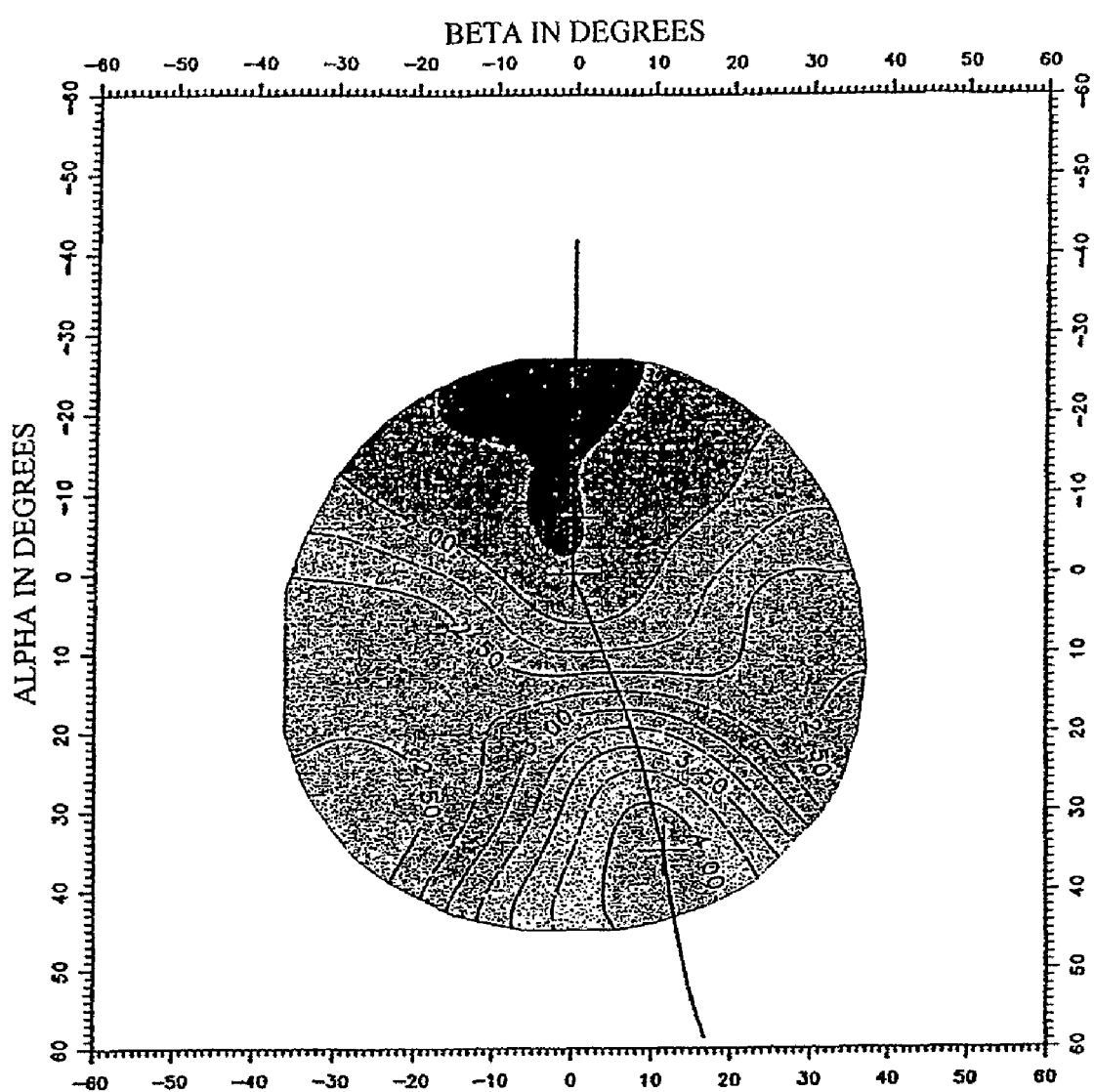
Figure 12:
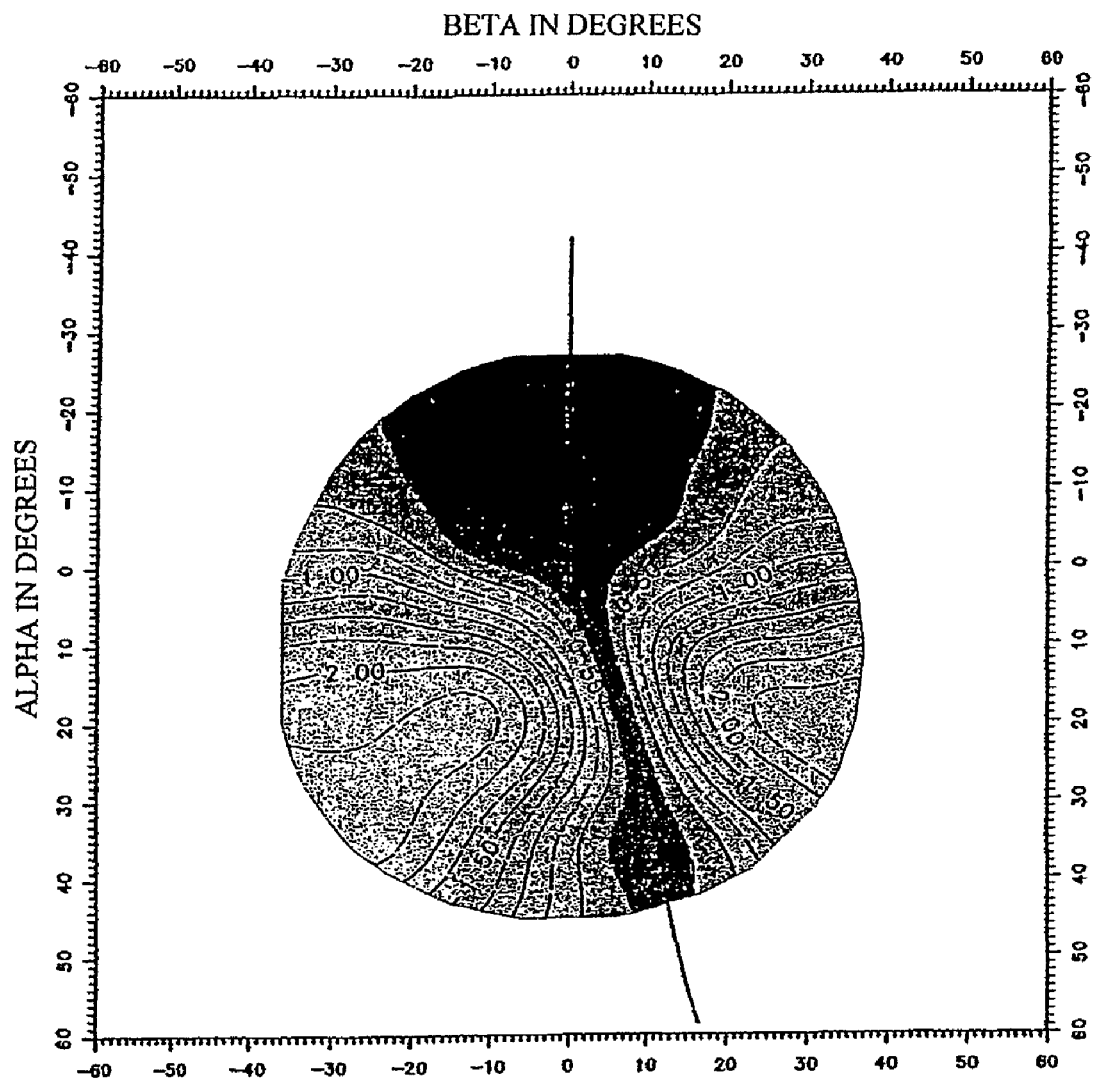
Figure 13:
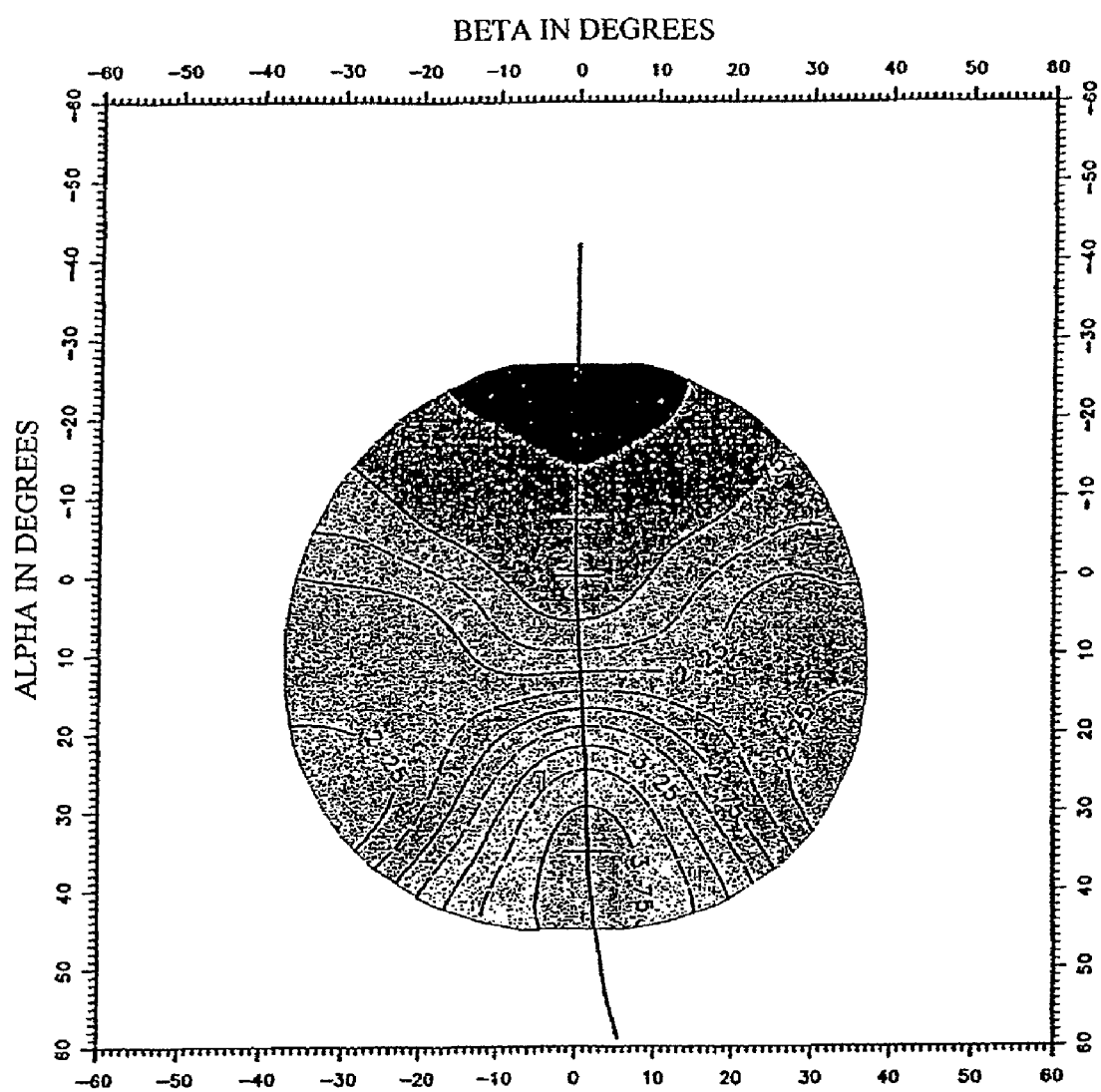
Figure 14:
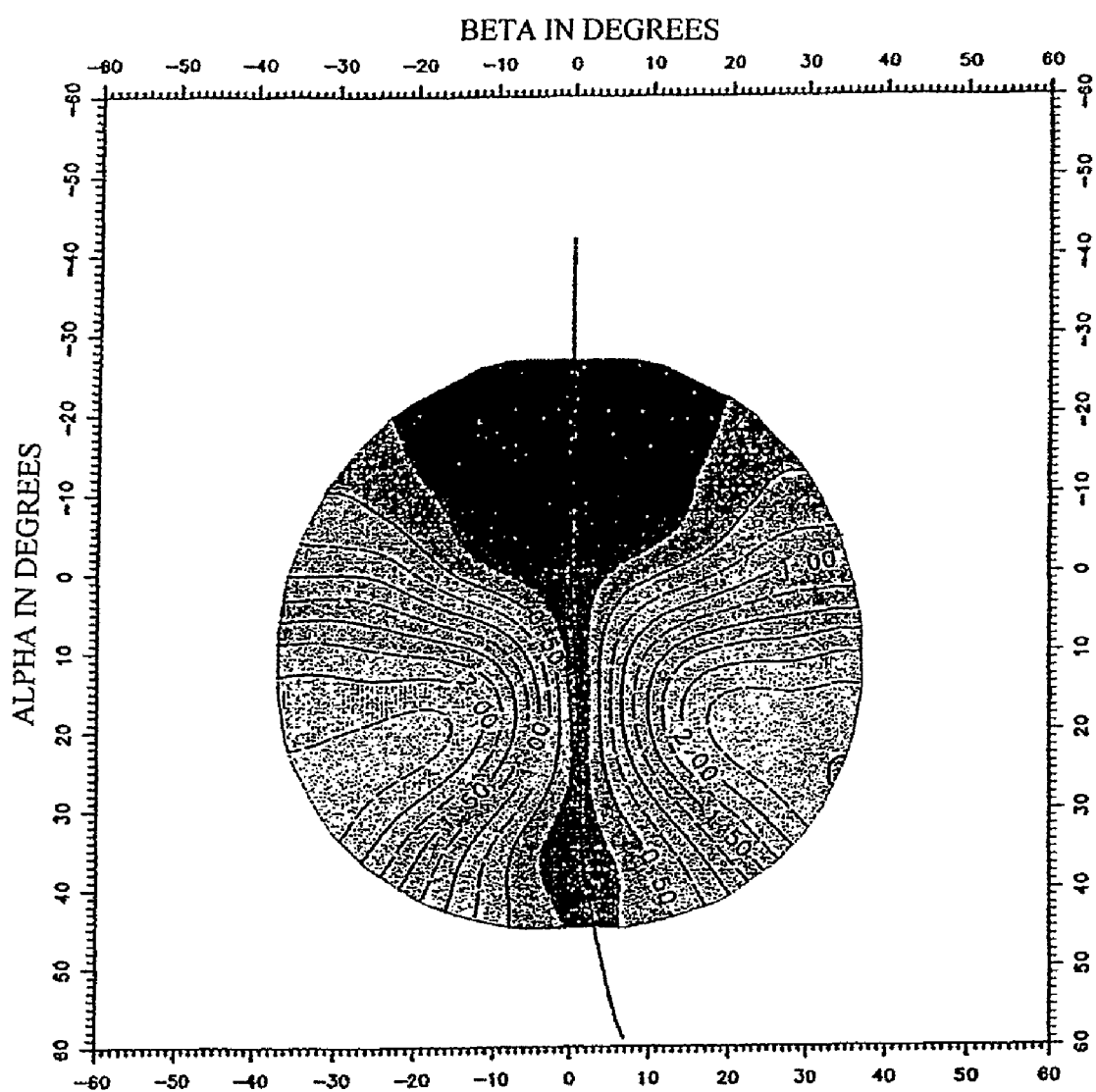

FIGS. 11 to 14 are similar views to those of FIGS. 7 to 10, for a lens determined as proposed in the first embodiment of the invention; the wearer has a shift of 25 mm of the sagittal plane relative to the standard sagittal plane; the sagittal plane is shifted towards the right eye. As a result the meridian of the left lens is greatly inclined towards the nose side; the meridian of FIGS. 11 and 12 is much more inclined towards the right than the meridian of FIGS. 7 and 8 are. In contrast, the meridian of the right lens of FIGS. 13 and 14 is less inclined towards the right than the meridian of FIGS. 9 and 10.

It is understood that the lens of FIGS. 11 to 14 is more suited to the wearer presenting a shift of the sagittal plane than that of FIGS. 7 to 10, as explained with reference to FIGS. 1 to 4.

FIGS. 15 and 16 show FIGS. 8 and 10, on which the meridians obtained according to the method of FIG. 6 are plotted. These meridians are the curves representing the impact on the lenses of the sight lines of the two eyes as a function of the height of viewing when the subject looks at points in its own sagittal plane. As shown in FIG. 15, in the near-vision zone, the meridian obtained according to the invention for the left eye is closer to the nose side than the meridian of the lens of the state of the art. As shown in FIG. 16, in the near-vision zone, the meridian obtained according to the invention for the right eye is closer to the temporal side than the meridian of the lens of the state of the art.

The figures show that the meridians obtained by the method of FIG. 6, represented in FIGS. 15 and 16, are slightly different from those obtained according to the method of FIG. 5, represented in FIGS. 11 to 14.

FIGS. 11 to 16 show that the lens obtained according to the method of the invention is distinguished from the lens of the state of the art by the shift of the meridian, which is not symmetrical between the left lens and the right lens. This can be observed on the lenses provided to the wearers; in fact, on the lenses provided by lens manufacturers there are fitting marks intended for the opticians and allowing the lenses to be fitted into the frames. These marks include marks which make it possible to locate the angular position of the lens; for example, circles etched on a horizontal line passing through the centre of the lens are used. The marks also include a removable mark locating the reference point for near vision. In a pair of lenses according to the invention, the mark of the reference point for near vision is not symmetrical on the left lens and on the right lens.

FIGS. 17 and 18 show views of the right and left lenses, showing the marks on the lenses. FIG. 17 shows the right lens, with the etched marks 108 and 110 allowing the angular locating of the lens; the mark for the reference point for the near vision has the reference 112 on the figure. FIG. 18 is a view similar to the left lens, the marks having the references 114, 116 and 118 respectively. A vertical axis passing through the geometrical centre of the lens is represented in the figures in dotted lines. FIGS. 17 and 18 show that the mark of the reference point for the near vision is almost below the centre of the right lens; by contrast, the mark of the reference point for the near vision is significantly shifted towards the nose side on the left lens. The example therefore corresponds to a shift of the sagittal plane towards the right eye relative to the standard sagittal plane. Moreover, the shift is quite large relative to the interpupillary half-distance, since the reference point for near vision is almost below the geometrical centre of the right lens.

FIGS. 17 and 18 show that it is simple to recognize lenses according to the invention: the reference points for near vision are in dissymmetrical positions, which is the reverse of the case for the lenses of the state of the art. More specifically, the reference points are shifted laterally; thus the point of intersection of the views of the wearer's left and right eyes is shifted relative to the standard sagittal plane.

An explanation is now provided, with reference to FIGS. 19 to 21, of how to measure the shift of the sagittal plane for a wearer. The method described with reference to the figures provides a measurement with great precision and reproducibility. This method is given only by way of example however, and another method could be used to measure the shift of the sagittal plane. The measurement method is based on the fact that the wearer, for tasks in near vision such as writing or reading, centres the document on its sagittal plane, in order to maximize his visual comfort. It is therefore sufficient to determine the position of the document relative to the standard sagittal plane during tasks in near vision in order to find the position of the sagittal plane of the subject. Moreover, the method is based on a hypothesis of wearer behaviour which is described below.

In order to measure the shift of the sagittal plane, the apparatus described with reference to FIG. 19 is used. This figure shows the wearer under measurement conditions. As shown in FIG. 19, the wearer 80 is sitting at a table; the wearer is equipped with a sensor 82, which is attached to his head, in the example of FIG. 19 on his forehead. This sensor provides information about position and orientation and therefore makes it possible to locate the position and the orientation of the wearer's head. The wearer is provided with a tablet 84 also having a sensor 86. The tablet 84 is able to receive a sheet of paper 88 used by the wearer for the reading and writing work. The sensor 86 is of the same type as the sensor 82; it therefore makes it possible to locate the position and the orientation in space of the tablet 84. The wearer is also provided with a pen 90, which is equipped with a third sensor making it possible to locate specific points of the head or the support during a calibration phase. For the sensors 82 and 86 magnetic sensors of the type provided by the company Polhemus under the reference 3Space Fastrak can be used. These sensors operate with an antenna 92, generating a magnetic field.

The method is described with reference to FIG. 20. At stage 96, the calibration of the apparatus is carried out. For this purpose, the first sensor is attached to the operator's head and he is given the tablet, with a pre-printed document. The wearer is then asked to point, using the third sensor, to specific points on the pre-printed document. This pointing makes it possible to locate the position of the document relative to the tablet, or more exactly the position of the second sensor relative to the document. As a result, no matter what the subsequent movement of the tablet, the position of the document in space is precisely known. The position of the first sensor relative to the standard sagittal plane is then determined; for this purpose, the position in space of the projection of the pupils in the plane of the wearer's lenses is determined. As a result, the position relative to the first sensor of the wearer's standard sagittal plane is determined.

After this calibration phase, an acquisition during a reading task is carried out, which is represented at stage 98 of FIG. 20. For the wearer this reading task consists simply of reading a text printed on the document. The text is known, and in particular the number of lines of text is known, as well as the position of the start and of the end of each line of text. During the reading, the position signals transmitted by the first and second sensors are recorded continuously.

An acquisition is then carried out during a writing task, which is represented at stage 100 of FIG. 20; if appropriate, the position of the document used during the writing relative to the tablet is calibrated again. The writing task consists of answering a questionnaire over several predefined lines, so as to entirely cover each of the lines. The questionnaire is presented in the form of a series of questions, each followed by a line in which the wearer must write the answer. The written text is then recorded, so as to determine, for each written line, the start and the end of the line. During writing, the position signals transmitted by the first and second sensors are recorded continuously.

The method continues with a stage of analysis of the results, represented at stages 102 to 106 of FIG. 20. For example a reference point linked to the sheets is used, in which the Y ordinates axis is parallel to the base of the document and orientated towards the right and the X abscissa axis is parallel to the large side of the document; the centre of the reference point is at the centre of the document. At each moment, it is possible to calculate, using the signals transmitted by the sensors, the position of the standard sagittal plane and, in this plane, the direction corresponding to a nil elevation of the eyes. It is therefore possible to calculate at any moment, the intersection $(X_o, Y_o)$ of the direction of nil elevation of the eyes in the sagittal plane with the document arranged on the tablet given to the wearer. FIG. 21 shows the changes in the $Y_0$ ordinates recorded during the writing task; in FIG. 21 the variations of the ordinate $Y_o$ are represented on the ordinates and the time on the abscissae. The graph of the figure shows that the $Y_0$ ordinate increases slowly, which represents the variations in the direction of viewing during a line of writing; then, the $Y_0$ ordinate decreases abruptly, which represents the return to the line of viewing. A period of quasi-immobility, of short duration, which corresponds to reading the question, is then observed; during this reading, the scanning of the line is carried out essentially with an eye movement, so that the user's head virtually does not move and the first sensor remains more or less immobile. Changes to the graph are repeated for the different lines of writing. This confirms that the wearer scans each line with a head movement. More specifically, the wearer scans the line with abrupt movements; which are followed by a movement of returning to the line. Analysis of the graph of FIG. 21 therefore makes it possible to determine the times of the start and the end of writing for each of the lines considered.

For the reading task, it turns out that the scanning of a line essentially takes place with eye movements, so that the returns to the line are not always visible. It is however possible, knowing the times of the start and the end of reading, to hypothesise a constant reading speed and to divide the data acquired into as many lines as are comprised in the document to be read.

At stage 102 of FIG. 20, the times of the start and the end of each of the lines read or written by the wearer are determined.

At stage 104, for each of the lines determined at stage 102, a calculation is made of the position of the mean sagittal plane for the line, as well as the intersection of the mean sagittal plane with the line. For each line i, an equation of the mean sagittal plane of the $y=a_i x+b_i$ type is obtained, along the x and y axes parallel to the X and Y axes mentioned above, using an origin at the centre of each line.

At stage 106, for the different lines and for the writing and reading tasks, the statistical values of the parameters $a_i$ and $b_i$ are calculated. The statistical value of the parameter b is representative of the shift of the sagittal plane for the user, relative to the standard sagittal plane.

The method described with reference to FIGS. 19 to 21 makes it possible to determine the value of the shift of the sagittal plane. The fact of providing the wearer with a mobile tablet allows the wearer to adopt any posture; the measurement is therefore not subject to a constraint of position imposed upon the wearer. The fact of using both reading and writing tasks makes the measurement more reliable; the tests conducted by the applicant show that the values of the shift in reading and in writing are often similar. Consideration of the mean value as proposed in the method described with reference to FIGS. 19 to 20 makes it possible to determine lenses suited to both reading and writing tasks.

The tests conducted by the applicant show that the values of shifting of the sagittal plane relative to the standard sagittal plane are stable over time for the same wearer. Thus, four series of measurements at intervals of one week make it possible to obtain similar shift values, with an absolute error less than or equal to 3 mm.

The invention is not limited to the embodiments given by way of examples. Thus it is possible to use other measurement methods of the shift than that which is proposed with reference to FIGS. 19 to 21; however this method has the advantage of simplicity and reliability. With reference to FIGS. 5 and 6 a method for the calculation of the lenses under the average wearing conditions is described; the wearing conditions could also be measured, in particular the interpupillary distance, in order to determine the lenses.

The invention claimed is:

1. Method for the determination of a pair of ophthalmic lenses for a wearer, comprising:
    measuring a shift in near vision of the wearer's sagittal plane, relative to a standard sagittal plane;
    choosing, as a function of the shift measured, target values for an optimization using optical calculation under wearing conditions;
    determining the pair of lenses by optimization using optical calculation under wearing conditions, using the chosen target values.

2. The method of claim 1, wherein choosing target values for the optimization comprises:
    provisioning targets in an object space for the wearer whose sagittal plane is merged with the standard sagittal plane;
    displacing the targets in a near-vision zone, with a displacement equal to the shift measured;
    displacing the targets in an intermediate-vision zone, with a displacement as a function of a height in the object space and the shift measured.

3. The method of claim 1, further comprising calculating a progression meridian,
    wherein calculating the progression meridian comprises:
        provisioning the progression meridian for the wearer whose sagittal plane is merged with the standard sagittal plane;
        deforming the progression meridian in an intermediate-vision zone and in a near vision zone, as a function of the shift measured; and
    choosing target values for the optimization comprises choosing target values outside the meridian.

4. The method of claim 1, 2, or 3, wherein measuring the shift in near vision comprises measuring a position of the wearer's sagittal plane during a writing a task.

5. The method of claim 1, 2, or 3, wherein measuring the shift in near vision comprises measuring a position of the wearer's sagittal plane during a reading task.

6. The method of claim 1, 2, or 3, wherein measuring the shift in near vision comprises measuring a position of the wearer's sagittal plane during a writing task or a reading task, for a line of the task, measuring a position of a mean sagittal plane relative to the centre of the line.

7. The method of claim 1, 2, or 3, wherein measuring the shift in near vision comprises measuring a position of the wearer's sagittal plane during a near-vision task.

8. The method of claim 1, 2, or 3, in which a position of the wearer's sagittal plane is estimated from a measurable quantity of a physiology of vision or of posture quantified, such as a visual dominance or a suppression in near vision.

9. A pair of progressive multifocal ophthalmic lenses, each lens comprising:
    a far-vision zone;
    a near-vision zone; an
    marks for the angularly locating of the lens and for locating a reference point of the near-vision zone, wherein
    for locating a reference point of the near-vision zone on the lens intended for a right eye and the mark for locating a reference point of the near-vision zone on the lens intended for a left eye are in dissymmetrical positions.

10. The pair of lenses of claim 9, in which, under wearing conditions, rays coming from a wearer's eyes and passing through the reference point of the near-vision zones of the lenses intersect at a point which is shifted relative to the wearer's standard sagittal plane.

* * * * *

UNITED STATES PATENT AND TRADEMARK OFFICE
CERTIFICATE OF CORRECTION

| | | |
|---|---|---|
| PATENT NO. | : 7,740,358 B2 | |
| APPLICATION NO. | : 11/574198 | |
| DATED | : June 22, 2010 | |
| INVENTOR(S) | : Claude Pedrono et al. | |

It is certified that error appears in the above-identified patent and that said Letters Patent is hereby corrected as shown below:

Column 12, line 14, delete "(writing a)" and insert --(writing)--, therefor.

Column 12, line 33, delete "(an)" and insert --(and)--, therefor.

Column 12, line 36, delete "(for)" and insert --(the mark for)--, therefor.

Signed and Sealed this
Third Day of May, 2011

David J. Kappos
*Director of the United States Patent and Trademark Office*